United States Patent

[11] 3,532,159

[72] Inventors Andrew G. Hammitt
Palos Verdes Peninsula;
James E. Broadwell, Palos Verdes Estates, California

[21] Appl. No. 747,174
[22] Filed July 24, 1968
[45] Patented Oct. 6, 1970

[73] Assignee TRW Inc.
Redondo Beach, California
a corporation of Ohio

[54] HIGH PERFORMANCE HEAT PIPE
5 Claims, 4 Drawing Figs.

[52] U.S. Cl. .......... 165/105, 62/514; 165/107(By disclosure only); 310/4(By disclosure only)
[51] Int. Cl. .......... F28d 15/00, H02n 3/00
[50] Field of Search .......... 165/105; 62/514

[56] References Cited

UNITED STATES PATENTS

| | | | |
|---|---|---|---|
| 308,197 | 11/1884 | Rober.......... | 165/105 |
| 1,894,593 | 1/1933 | Lamm.......... | 313/12 |
| 2,529,915 | 11/1950 | Chausson.......... | 165/105X |
| 3,229,759 | 1/1966 | Grover.......... | 165/105 |

FOREIGN PATENTS

| | | | |
|---|---|---|---|
| 22,272 | 1892 | Great Britain.......... | 165/105 |
| 280,659 | 7/1962 | Netherlands .......... | 165/105 |
| 500,133 | 2/1939 | Great Britain.......... | 165/105 |

*Primary Examiner*—Robert A. O'Leary
*Assistant Examiner*—Albert W. Davis
*Attorneys*—Daniel T. Anderson, Donald R. Nyhagen and Jerry H. Dinardo

ABSTRACT: A high performance heat pipe containing a heat transfer fluid and having external heat input and rejection sections disposed in heat transfer relation to interior heating and cooling regions within the heat pipe, whereby exposure of the heat input section to a heat source and the heat rejection section to a heat sink causes heating of the fluid within the heating region by thermal energy absorption from the heat source and cooling of the fluid within the cooling region by thermal energy rejection to the heat sink, and thermal energy conversion means for converting the temperature differential between the heating and cooling regions into kinetic energy of the heat transfer fluid, as by an expansion and diffusion process or a magneto-hydrodynamic pumping action, to induce recirculating flow of the fluid between the regions, thus to effect continuous thermal energy transfer from the heat source to the heat sink.

INVENTORS
ANDREW G. HAMMITT
BY JAMES E. BROADWELL

ATTORNEY

HIGH PERFORMANCE HEAT PIPE

BACKGROUND OF THE INVENTION

1. Field of the Invention

This invention relates generally to heat transfer devices and more particularly to a novel high performance heat pipe.

2. Prior Art

Heat transfer devices or heat exchangers of the class which are commonly referred to as heat pipes are well-known in the art. Such heat pipes, for example, are disclosed in U.S. Pat. No. 1,663,709; 2,052,014; 2,893,706; 3,024,298; 3,229,759; and 3,286,485 . In general terms, a heat pipe is characterized by a hermetic casing containing a heat transfer fluid and having heat input and heat rejection sections disposed in heat transfer relation to heating and cooling regions, respectively, within the pipe. In operation, the heat input and heat rejection sections of the heat pipe are exposed to a heat source and a heat sink respectively, in such a way that the heat transfer fluid within the pipe undergoes a closed thermodynamic heat transfer cycle. This heat transfer cycle involves heating of the fluid within the heating region by heat absorption from the heat source, flow of the heated fluid to the cooling region, cooling of the fluid within the cooling region by heat rejection to the heat sink, and return flow of the cooled fluid to the heating region to repeat the cycle. Thermal energy is thereby continuously transferred from the heat source, through the heat pipe, to the heat sink.

It is evident from the above discussion that operation of a heat pipe requires continuous flow of the heat transfer fluid from the heating region to the cooling region and continuous return flow of the fluid from the cooling region to the heat region. In the existing heat pipes, the driving force for inducing such recirculation of the heat transfer fluid is obtained in various ways. Referring to the above listed prior art patents, for example, the heat transfer fluid is water or other liquid which is vaporized within the heating region of the heat pipe and condensed within the cooling region of the pipe, such that the fluid exists in both its liquid and vapor phases. In this type of heat pipe, the heating region is referred to as an evaporator region and the cooling region is referred to as a condenser region. The heat transfer cycle of the pipe involves vaporization of the fluid within the evaporator region, vapor flow from the evaporator region to the condenser region, condensation of the vapor phase within the condenser region, and return liquid flow from the condenser region to the evaporator region to repeat the cycle. The driving force for causing continuous flow of the vapor phase from the evaporator region to the condenser region is furnished by the vapor pressure differential which exists between these regions because of the higher temperature of the heat transfer fluid within the evaporator region through the heat transfer fluid within the condenser region. The driving force for inducing return flow of the liquid phase from the condenser region to the evaporator region, on the other hand, is created in various ways, as by a mechanical pumping action, gravity action, or capillary action. In the other heat pipes, the heat transfer fluid is a liquid which remains in its liquid phase throughout the entire heat transfer cycle. A pump or other means is employed to circulate the fluid between the heating and cooling regions. For convenience in the ensuing description, these two types of heat pipes are referred to as two-phase and single-phase pipes, respectively.

SUMMARY OF THE INVENTION

The primary aim of the present invention is to increase the thermal conductance of a heat pipe. In this regard, it is well-known that a major advantage of heat pipes resides in the fact that they exhibit a thermal conductance which is several orders of magnitude greater than the thermal conductance of any metal. Further increase in the thermal conductance of heat pipes, however, is highly desirable.

To this end, the invention provides a heat pipe embodying energy conversion means for converting the potential energy represented by the temperature differential between the heating and cooling regions of the pipe to kinetic energy of the heat transfer fluid for inducing circulation of the fluid between these regions. One illustrative embodiment of the invention, for example, is a two-phase heat pipe in which energy conversion means comprise a nozzle within the vapor flow path through the heat pipe and a diffuser within the liquid flow path of the pipe. The nozzle expands the vapor phase of the heat transfer fluid from the relatively high pressure level corresponding to the fluid temperature within the heating or evaporator region to the relatively low pressure level corresponding to the fluid temperature within the cooling or condenser region in such a way that the vapor phase enters the condenser region as a high velocity vapor stream which is condensed within the latter region to produce a high velocity liquid stream. The diffuser diffuses this high velocity liquid stream back to the pressure level within the evaporator region. Accordingly, the heat transfer fluid undergoes continuous recirculation from the evaporator region to the condenser region through the vapor flow path and from the condenser region to the evaporator region through the liquid flow path. A second disclosed embodiment of the invention is a single-phase heat pipe which in the heat transfer fluid is an electrically conductive fluid, and the energy conversion means comprise an electrothermal generator and magnetohydrodynamic pump. Mutually perpendicular electric and magnetic fields are created in the heat transfer fluid within one region of the heat pipe, preferably the heating region, in such a way that the fields interact to produce a driving or pumping force on the fluid for inducing circulation of the latter between the heating and cooling regions.

DESCRIPTION OF THE PREFERRED EMBODIMENTS

Figures 1, 2, 3, 4:
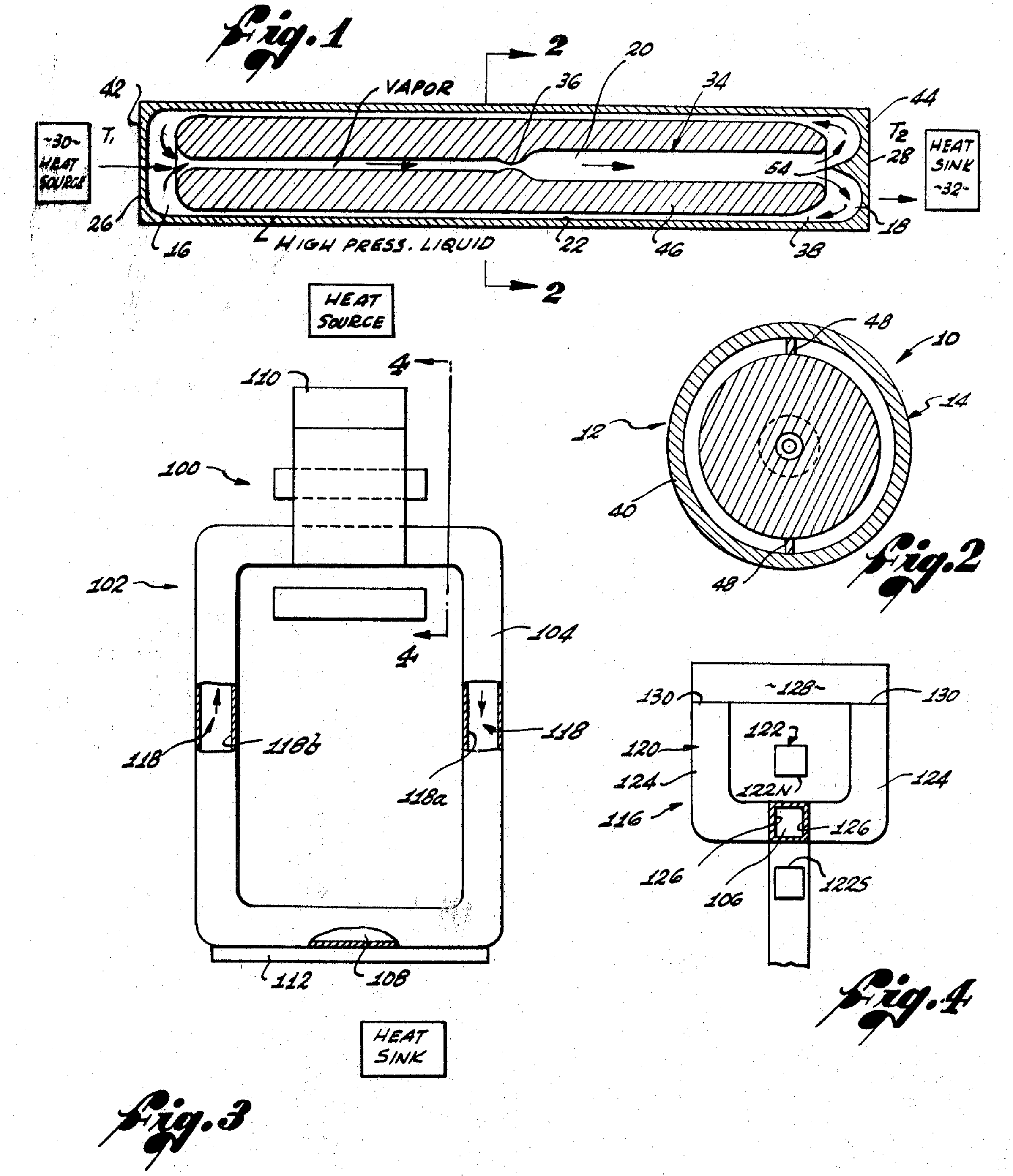
FIG. 1 is a longitudinal section through a two-phase high performance heat pipe according to the invention.
FIG. 2 is an enlarged section taken on line 2–2 in FIG. 1.
FIG. 3 is a side elevation, partly in section, of a single-phase heat pipe according to the invention.
FIG. 4 is a section taken on line 4–4 in FIG. 3.

In general terms, the invention provides a heat pipe, represented in FIGS. 1 and 2 by the heat pipe 10, having a body 12 including a hermetic casing 14 containing a heat transfer fluid. Casing 14 has spaced interior heating and cooling regions 16, 18 and interior fluid flow paths 20, 22 communicating the regions. The heat pipe casing has external heat input and heat rejection sections or surfaces 26, 28 disposed in heat transfer relation to the heating and cooling regions 16, 18, respectively. The heat input and rejection sections of the heat pipe are adapted to be exposed to a heat source 30 and a heat sink 32, respectively.

The heat pipe structure described thus far is conventional. During operation of the heat pipe, the heat transfer fluid within the pipe undergoes a closed thermodynamic heat transfer cycle. This cycle involves heating of the heat transfer fluid within the heating region 16 by heat absorption from the heat source 30, flow of the heated fluid to the condenser region 18 through the flow path 20, cooling of the fluid within this region by heat rejection to the heat sink 32, and return flow of the cooled fluid back to the heating region through the flow path 22 to repeat the cycle. The heat pipe thus operates to continuously transfer heat from the heat source to the heat sink.

The thermal conductance and efficiency of the heat pipe are functions of the rate of circulation of the heat transfer fluid between the heating and cooling regions of the pipe. In this regard, it will be recalled that the driving force for inducing flow of the vapor phase of the heat transfer fluid from the evaporator region to the condenser region of the existing two-phase heat pipes is provided by the vapor pressure differential existing between these regions. The driving force for inducing return flow of the liquid phase from the condenser region to the evaporator region, on the other hand, is produced in various ways, as by gravity action, capillary action, or mechanical pumping action. In the existing single-phase heat pipes, the heat transfer fluid is circulated by mechanical pumping means or other means. While these techniques of inducing circulation of the heat transfer fluid through the existing heat pipes provide pipes with a thermal conductance which is several orders of magnitude greater than any metal, nevertheless, such techniques do undesirably limit the thermal conductance of the existing heat pipe.

According to the present invention, this deficiency of the existing heat pipes is avoided by effectively converting the potential energy, represented by the temperature differential between the heating and cooling regions 16, 18 of the heat pipe 10, to kinetic energy of the heat transfer fluid in such a way as to induce circulation of the fluid between the regions at a substantially greater flow rate than in the existing heat pipes. This results in a corresponding increase in the thermal conductance of the present heat pipe.

To this end, the heat pipe 10 of the invention is equipped with energy conversion means 34 for converting the potential energy represented by the temperature differential between the heating and cooling region 16, 18 to kinetic energy of the heat transfer fluid. As will appear from the ensuing description, this energy conversion process may be accomplished in various ways. The particular heat pipe 10 under discussion, for example, is a two-phase heat pipe in which the heating and cooling regions 16, 18 are evaporator and condenser regions, respectively, and the flow paths 20, 22 are liquid and vapor flow paths, respectively. The energy conversion means 34 comprise an orifice or nozzle 36 in the vapor flow path 20 and a liquid diffuser 38 defined by the condenser region 18. A later described embodiment of the invention is a single-phase heat pipe in which the energy conversion means comprise a magnetohydrodynamic pumping means disposed within the thermal flow path through the heat pipe so as to be activated or energized by the heat flow which occurs from the heat source 30 to the heat sink 32 through the heat pipe.

Briefly, in operation of the two-phase heat pipe 10, the liquid phase of the heat transfer fluid is evaporated within the evaporator region 16 of the pipe by heat absorption from the heat source 30. The resulting vapor phase flows through the nozzle 36 to the condenser-diffuser region 18. During its flow through the nozzle, the vapor phase is expanded from the relatively high pressure level corresponding to the fluid temperature within the evaporator region to the relatively low pressure level corresponding to the temperature within the condenser region and in such a way that the vapor phase enters the condenser region as a high velocity vapor stream. The condenser region is so constructed and arranged that the vapor phase in the stream is condensed within the condenser region with minimum velocity loss to produce a relatively high velocity liquid stream. During its flow through the condenser region, this high velocity liquid stream is diffused from the relatively low pressure level within the condenser region to the relatively high pressure level within the evaporator region, whereby the heat transfer fluid 24 undergoes continuous circulation at a relatively high flow rate through the evaporator and condenser regions 16, 18.

Referring now in greater detail to the drawings, the hermetic casing 14 of the illustrated two-phase heat pipe 10 has a generally cylindrical shape and includes a cylindrical sidewall 40 and endwalls 42, 44. The casing endwall 42 provides the heat input section or surface 26 of the heat pipe. The casing endwall 44 provides the heat rejection section or surface 28 of the heat pipe. In addition to the casting 14, the body 12 of the heat pipe 10 comprises a generally annular core 46 concentrically positioned within the casting. The ends of this core are axially spaced from the casing endwall 42, 44 to define therebetween the evaporator and condenser regions 16, 18, respectively. The core is radially spaced from the casing sidewall 40 to define therebetween an annular passage which constitutes the liquid flow path 22. Core 46 may be concentrically mounted within the casting 14 in any convenient way, as by means of struts 48 extending between the core and the casing sidewall 40. Extending centrally through the core is a passage which constitutes the vapor flow path 20.

The inner surface of the casing endwall 42 and the adjacent annular end of the casing core 46 are mounted in transverse section, as illustrated, to induce smooth, turbulent-free flow of the heat transfer fluid from the liquid return passage 22 through the evaporator region 16 to the vapor passage 20. Similarly, the inner surface of the casing endwall 44 and the adjacent end of the core 46 are rounded, in transverse section to induce smooth turbulent-free flow of the heat transfer fluid from the vapor passage 20 through the condenser region 18 to the liquid passage 22. In this latter regard, it will be observed that the inner surface of the endwall 44 is a generally semitoroidal surface of revolution which is generated about the axis of the vapor passage 20. The radially inner boundary of this surface approaches the axis tangentially to define an axially projecting, generally conical endwall formation 54 on the axis. The outer boundary of the surface merges tangentially with the inner surface of the cylindrical casing sidewall 40.

Turning now to the energy conversion means 34, it will be observed that the central vapor passage 20 through the core 46 has a relatively small diameter entrance portion, a relatively large diameter exit portion, and an intervening constriction which constitutes the nozzle 36. The condenser end of the annular liquid return passage 22 has an inner annular boundary wall furnished by the adjacent end of the casing core 46 and an outer annular boundary wall furnished by the cylindrical casing sidewall 40 and the radially outer portion of the adjacent semitoroidal inner surface of the casing endwall 44. The condenser end of the core 46 is externally tapered in the manner illustrated such that these inner and outer boundary walls of the liquid passage converge in the direction of the evaporator region 16 to provide the passage with a progressively diminishing radial width in the region 38.

The operation of the illustrated high performance heat pipe 10 is believed to be obvious from the preceding description. Thus, in operation of the heat pipe, the latter is positioned between the heat source 30 and the heat sink 32 in such a way that the heat input section 26 of the pipe is exposed to the heat source and the heat rejection section 28 of the pipe is exposed to the heat sink. Under these conditions, the liquid phase of the heat transfer fluid within the pipe is evaporated within the evaporator region 16 by heat inflow from the heat source and the vapor phase is condensed within the condenser region 18 by heat rejection to the heat sink. This produces a vapor pressure differential between the evaporator and condenser regions which induces flow of the vapor phase from the evaporator region to the condenser region through the vapor passage 20. During its flow through this passage, the vapor phase expands through the nozzle 36 from the relatively high pressure level corresponding to the heat transfer fluid temperature within the evaporator region to the relatively low pressure level corresponding to the fluid temperature within the condenser region. The vapor phase emerges from the nozzle into the condenser region 18 as a relatively high velocity vapor stream which is diverted radially out toward the annular liquid return passage 22 by the inner semitoroidal surface of the adjacent casing endwall 44. This surface, and the adjacent rounded end of the casing core 46, are curved in such a way that the emerging vapor stream enters and flows through the condenser region with minimum velocity loss.

As the high velocity liquid stream passes through the condenser region 18 it is simultaneously condensed and diffused from the relatively low pressure level within the condenser region to the relatively high pressure level within the evaporator region 16. Accordingly, the heat transfer fluid undergoes continuous circulation from the evaporator region 16 to the condenser region 18 and then back to the evaporator region to effect continuous heat transfer from the heat source 30 to the heat sink 32, as in the existing heat pipes. However, because of the energy conversion process which occurs in the present heat pipe, the latter exhibits a substantially higher thermal conductance than the existing heat pipes.

Turning now to FIGS. 3 and 4 there is illustrated single-phase high performance heat pipe 100 according to the invention. This heat pipe, like the heat pipe just described, has a body 102 including a hermetic casing 104. The heat pipe has heat input and heat rejection sections 110, 112 which are disposed in heat transfer relation to heating and cooling regions 106, 108, respectively, and are adapted to be exposed to the heat source 30 and heat sink 32. Contained within the heat pipe casing 104 is a heat transfer fluid. In this instance, the heat transfer fluid is an electrically conductive fluid, such as a liquified metal, which exists in its liquid phase only. The heat pipe 100 also includes energy conversion means 116 for converting the potential energy represented by the temperature differential between the heat input section 110 and the fluid heat transfer area 106 into kinetic energy of the heat transfer fluid for inducing circulation of the fluid through the heat pipe.

Referring in greater detail to the single-stage heat pipe 100, the heat pipe casing 104 has a generally annular shape e and defines an interior closed loop passage 118 communicating the heating and cooling regions 106, 108.

The energy conversion means 116 of the pipe comprises a combined thermoelectric generator and magnetohydrodymanic pumping means which are mounted on the heat pipe casing 104 at one of the heat pipe regions 106, 108. For convenience these means are hereinafter referred to as a magnetohydrodynamic pumping means or simply a pumping means. As it will appear from the ensuing description, the pumping means may conceivably be located at either the heat input or heat rejection end of the heat pipe. According to the preferred practice of the invention, however, the pumping means is located at the heat input end. For this reason, the heat pipe has been illustrated and will be described in connection with this particular placement of the pumping means.

The magnetohydrodynamic pumping means 116 is generally conventional and, therefore, need not be described in complete detail. Suffice it to say that the pumping means comprises a thermoelectric generator 120 and magnet means 122. The thermoelectric generator 120 is interposed between the heat input section 110 and the heating region 106 of the heat pipe and provides a thermal conductor for conveying heat from the input section to the heating region when the input section is exposed to the heat source 30. The generator is activated or energized by this heat flow. Generator 120 and magnet means 122 are constructed and arranged to produce in the heat transfer fluid within the heating region 106 mutually perpendicular electric and magnetic fields which interact to create a resultant magnetohydrodynamic pumping or driving force on the fluid for inducing circulation of the fluid in one direction through the heat pipe passage 118.

The thermoelectric generator 120 has a pair of thermoelectric elements 124 which straddle, at one end, the heat pipe casing 104 at its heating region 106. These ends of the elements turn inwardly and are joined to the metallic wall of the casing to form thermal electric junctions 126 of the generator. The opposite ends of the elements are joined to a thermal electric element 128 to form thermal electric junctions 130 of the generator.

It will now be understood, therefore, that during operation of the heat pipe 100, heat flow through the generator 120 from the heat input section 110 to the heating region 106 of the pipe occurs through the generator junctions 126, 130 to produce an electrical current flow between the junctions 126 and horizontally as viewed in FIG. 4 through the intervening electrically conductive heat transfer fluid within the heating region. The north and south poles 122N, 122S of the magnet means 122 straddle the heat pipe casing 104 in the vertical direction as viewed in FIG. 4 so as to create a vertical magnetic field within the heat transfer fluid. These two fields, that is the electric field produced by the generator 120 and the magnetic field produced by the magnet means 122, interact to create the above-mentioned magnetohydrodynamic pumping force on the heat transfer fluid for inducing circulation of the latter in the direction indicated through the heat pipe casing 104.

It is now evident that during operation of the modified heat pipe 100, the heat transfer fluid is heated within the heating 106 of the pipe by the heat inflow to the pipe which occurs from the heat source 30, through the heat input section 110 and thermoelectric generator 120, to the heating region. The heat transfer fluid is induced to flow from the heating region to the cooling region 108 by the magnetohydrodynamic pumping force produced by the pumping means 116. The fluid is then cooled in the cooling region 106 by heat rejection to the heat sink 32, after which the cooled heat transfer fluid is returned to the heating region to repeat the cycle, again by the magnetohydrodynamic pumping action of the pumping means 116.

While the invention has been disclosed in connection with certain of its physical embodiments, it will be obvious that various modifications of the invention are possible within the spirit and scope of the following claims.

We claim:

1. A high performance heat pipe comprising:

an elongate hermetic casing having interior evaporator and condenser regions adjacent its ends;

an annular core concentrically disposed within said casing in spaced relation thereto so as to define between said casing and core an intervening annular passage communicating said regions;

said core containing a central passage communicating said regions;

a two-phase heat transfer fluid within said casing consisting of a liquid phase and a vapor phase;

said casing having external heat input and heat rejection sections at said casing ends disposed in heat transfer relation to said evaporator and condenser regions, respectively, and adapted to be exposed to a heat source and a heat sink, respectively, thereby to cause evaporation of said liquid phase within said evaporator region by heat transfer from said heat source and condensation of said vapor phase within said condenser region by heat rejection to said heat sink;

one of said passages comprising a vapor flow passage for conveying said vapor phase from said evaporator region to said condenser region and defining a nozzle adjacent said condenser region for expanding said vapor phase from the relatively high pressure level corresponding to the temperature within said evaporator region to the relatively low pressure level corresponding to the temperature within said condenser region in such a way that said vapor phase enters said condenser region as a high velocity vapor stream and is condensed to the liquid phase within said condenser region with minimum velocity loss to provide a high velocity liquid stream; and the other passage comprising a liquid return passage for conveying said liquid phase from said condenser region to said evaporator region and said return passage having a convergent portion immediately adjacent said condenser region which progressively diminishes in cross-sectional flow area in the direction of liquid flow through said return passage from said condenser region to said evaporator region to define a convergent diffuser for diffusing said high velocity liquid stream from the relatively low pressure level within said condenser region to the relatively high pressure level within said evaporator region.

2. A high performance heat pipe comprising:

an elongate hermetic casing having interior evaporator and condenser regions adjacent it ends;

an annular core concentrically disposed within said casing in spaced relation thereto so as to define between said casing and core an intervening velocity passage communicating said from and said core containing a central passage communicating said regions;

a two-phase heat transfer fluid within said casing consisting of a liquid phase and a vapor phase;

said casing having external heat input and heat rejection sections at said casing ends disposed in heat transfer relation to said evaporator and condenser regions, respectively, and adapted to be exposed to a heat source and a heat sink, respectively, thereby to cause evaporation of said liquid phase within said evaporator region by heat transfer from said heat source and condensation of said vapor phase within said condenser region by heat rejection to said heat sink;

said central passage comprising a vapor flow passage for conveying said vapor phase from said evaporator region to said condenser region and having a relatively small diameter entrance portion and a relatively large diameter exit portion which define therebetween an intervening nozzle for expanding said vapor phase from the reatively high pressure level corresponding to the temperature within said evaporation region to the relatively low pressure level corresponding to the temperature within said condense region in such a way that said vapor phase enters said condenser region as a high velocity vapor stream and is condensed to the liquid phase within said condense region with minimum velocity loss to provide a high velocity liquid stream; and said annular passage comprising a liquid return passage for conveying said liquid phase from said condenser region to said evaporator region and having an end portion adjacent said condenser region which progressively diminishes in radial width in the direction of said evaporator region to form a diffuser for diffusing the liquid phase in said vapor stream from a relatively low pressure level within said condenser region to the relatively high pressure level within said evaporator region.

3. A high performance heat pipe according to claim 2 wherein:

the heat rejection end of said casing includes an internal, generally semitoroidal surface of revolution generated about the axis of said central passage and facing said evaporator region; and said surface approaching said axis generally tangentially and emerging tangentially with the outer wall of said annular passage for deflecting said vapor stream radially out toward said annular passage with minimum velocity loss about a full 360° of said passages.

4. A high performance heat pipe comprising:

an outer elongate hermetic casing having heat input and heat rejection ends and interior evaporator and condenser regions within and disposed in heat transfer relation to said heat input and heat rejection ends, respectively;

means within said casing defining a vapor flow passage and a liquid return passage each opening at one end to said evaporator region and at the other end to said condenser region so as to communicate said regions;

a two-phase heat transfer fluid within said casing having liquid phase and a vapor phase;

said heat input and heat rejection ends of said casing being adapted to be exposed to a heat source and a heat sink, respectively, thereby to cause evaporation of said liquid phase within said evaporator region by heat transfer from said heat source and condensation of said vapor phase within said condenser region by heat rejection to said heat sink;

said vapor passage having an orifice adjacent said condenser region for expanding said vapor phase from the relatively high pressure level corresponding to the temperature within said evaporator region to the relatively low pressure level corresponding to the temperature within said condenser region in such a way that said vapor phase enters said condenser region as a high velocity vapor stream and is condensed to the liquid phase within said condenser region with minimum velocity loss to provide a high velocity liquid stream; and said return passage having a convergent portion immediately adjacent said condenser region which progressively diminishes in cross-sectional flow area in the direction of liquid return flow through said return passage from said condenser region to said evaporator region to define a convergent diffuser for diffusing the liquid phase in said vapor stream from the relatively low pressure level within said condenser region to the relatively high pressure level within said evaporator region.

5. A high performance heat pipe according to claim 4 wherein:

said condenser region has a boundary wall surface directly opposite the adjacent end of said vapor passage which is impinged by the high velocity vapor stream emerging from the latter passage; and said wall surface extends to the adjacent end of said return passage and is curved to progressively turn said high velocity vapor stream and the resulting high velocity liquid stream into said return passage with minimum velocity loss.